(12) United States Patent
Prasad et al.

(10) Patent No.: US 12,265,644 B1
(45) Date of Patent: *Apr. 1, 2025

(54) DEVICE MANAGEMENT AND SECURITY THROUGH A DISTRIBUTED LEDGER SYSTEM

(71) Applicant: United Services Automobile Association (USAA), San Antonio, TX (US)

(72) Inventors: Bharat Prasad, San Antonio, TX (US); Thomas Bret Buckingham, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,750

(22) Filed: Sep. 20, 2022

Related U.S. Application Data

(63) Continuation of application No. 16/505,945, filed on Jul. 9, 2019, now Pat. No. 11,481,509.

(Continued)

(51) Int. Cl.
*G06F 21/62* (2013.01)
*G06F 16/2455* (2019.01)
(Continued)

(52) U.S. Cl.
CPC .... *G06F 21/6227* (2013.01); *G06F 16/24564* (2019.01); *H04L 9/50* (2022.05);
(Continued)

(58) Field of Classification Search
CPC ........... G06F 21/6227; G06F 16/24564; H04L 63/0876; H04L 63/10; H04L 63/107; H04L 9/50
See application file for complete search history.

(56) References Cited

U.S. PATENT DOCUMENTS 6,757,262 B1   6/2004   Weisshaar et al.
6,978,293 B1   12/2005  Wong et al.
(Continued)

FOREIGN PATENT DOCUMENTS

CN   107122985   9/2017
CN   108737348   11/2018
(Continued)

OTHER PUBLICATIONS

Novo, Oscar. (Mar. 2018). Blockchain Meets IoT: An Architecture for Scalable Access Management in IoT. IEEE Internet of Things Journal, 5. 1184-1195. (Year: 2018).*

(Continued)

*Primary Examiner* — Zhimei Zhu
(74) *Attorney, Agent, or Firm* — Fish & Richardson P.C.

(57) ABSTRACT

Techniques are described for managing internet-of-things (IoT) devices, such as managing the storage of data generated by the IoT devices, managing the access, to the data, by users, processes, and/or other entities, managing command and control of the devices, and so forth. In some implementations, an IoT platform is provided for IoT device management, and the IoT platform can be agnostic with respect to providers. For example, the IoT platform may provide one or more common interfaces that enable communications with IoT devices that are manufactured by different device providers. In some implementations, a distributed ledger system (DLS) is employed to facilitate IoT device management. For example, the DLS can act as a gateway and/or overall interface to control access of users, processes, devices, IoT device providers, and/or other entities to the IoT devices and/or to an IoT platform.

21 Claims, 11 Drawing Sheets

Related U.S. Application Data

(60) Provisional application No. 62/696,209, filed on Jul. 10, 2018.

(51) Int. Cl.
    *H04L 9/00*      (2022.01)
    *H04L 9/40*      (2022.01)
    *H04L 67/12*     (2022.01)

(52) U.S. Cl.
    CPC .......... *H04L 63/0876* (2013.01); *H04L 63/10* (2013.01); *H04L 63/107* (2013.01); *H04L 67/12* (2013.01)

(56) References Cited

U.S. PATENT DOCUMENTS

| | | |
|---|---|---|
| 8,539,567 B1 | 9/2013 | Logue et al. |
| 8,843,239 B2 | 9/2014 | Mighdoll et al. |
| 9,172,698 B1 | 10/2015 | Evans et al. |
| 9,538,578 B1 | 1/2017 | Sramatakis et al. |
| 9,614,852 B2 | 4/2017 | Kiriyama |
| 9,654,461 B2 | 5/2017 | Seibert, Jr. et al. |
| 9,668,085 B2 | 5/2017 | Pi-Sunyer |
| 9,703,570 B2 | 7/2017 | Herberg |
| 9,774,595 B2 | 9/2017 | Omnes et al. |
| 9,820,120 B2 | 11/2017 | deCharms |
| 9,838,390 B2 | 12/2017 | Zakaria |
| 9,843,624 B1 | 12/2017 | Taaghol et al. |
| 9,853,965 B2 | 12/2017 | Yin et al. |
| 10,104,077 B1 | 10/2018 | Irwan et al. |
| 10,148,629 B1 | 12/2018 | Roth et al. |
| 10,425,414 B1 | 9/2019 | Buckingham et al. |
| 10,826,703 B1 | 11/2020 | Shipley |
| 11,115,418 B2 | 9/2021 | Xie et al. |
| 11,218,478 B1 | 1/2022 | Buckingham et al. |
| 11,481,509 B1 | 10/2022 | Prasad et al. |
| 11,625,460 B1 | 4/2023 | Buckingham et al. |
| 2006/0029223 A1 | 2/2006 | Ari |
| 2006/0062201 A1 | 3/2006 | Funk et al. |
| 2006/0129627 A1 | 6/2006 | Philips et al. |
| 2008/0031456 A1 | 2/2008 | Harrison et al. |
| 2008/0267101 A1 | 10/2008 | Webb et al. |
| 2010/0138908 A1 | 6/2010 | Vennelakanti et al. |
| 2010/0287547 A1 | 11/2010 | Korkishko et al. |
| 2011/0289576 A1 | 11/2011 | Cheng |
| 2012/0084846 A1 | 4/2012 | Weis et al. |
| 2012/0137301 A1 | 5/2012 | Roslak et al. |
| 2014/0003600 A1 | 1/2014 | Cooke |
| 2014/0047322 A1 | 2/2014 | Kim et al. |
| 2014/0080467 A1 | 3/2014 | Urbanek |
| 2014/0086412 A1 | 3/2014 | Shibata |
| 2014/0108943 A1 | 4/2014 | Lee et al. |
| 2014/0164764 A1 | 6/2014 | Pushkin et al. |
| 2014/0281523 A1 | 9/2014 | Golino |
| 2014/0357187 A1 | 12/2014 | Ehrensvard |
| 2015/0002261 A1 | 1/2015 | Schiavi et al. |
| 2015/0113172 A1 | 4/2015 | Johnson et al. |
| 2015/0222621 A1 | 8/2015 | Baum et al. |
| 2015/0229643 A1 | 8/2015 | Kiriyama et al. |
| 2015/0244690 A1 | 8/2015 | Mossbarger |
| 2015/0281002 A1 | 10/2015 | Xu et al. |
| 2015/0295763 A1 | 10/2015 | Yu et al. |
| 2015/0312256 A1 | 10/2015 | Seibert, Jr. et al. |
| 2015/0373149 A1 | 12/2015 | Lyons |
| 2015/0381776 A1 | 12/2015 | Seed et al. |
| 2016/0072839 A1 | 3/2016 | Mortimore, Jr. |
| 2016/0075034 A1 | 3/2016 | Laurent et al. |
| 2016/0112260 A1 | 4/2016 | Pai et al. |
| 2016/0112262 A1 | 4/2016 | Johnson et al. |
| 2016/0112429 A1 | 4/2016 | Sundaresan et al. |
| 2016/0135241 A1 | 5/2016 | Gujral et al. |
| 2016/0164884 A1 | 6/2016 | Sriram et al. |
| 2016/0191483 A1 | 6/2016 | Larson et al. |
| 2016/0197772 A1 | 7/2016 | Britt et al. |
| 2016/0203572 A1 | 7/2016 | McConaghy et al. |
| 2016/0212099 A1 | 7/2016 | Zou et al. |
| 2016/0262021 A1 | 9/2016 | Lee et al. |
| 2016/0275461 A1* | 9/2016 | Sprague ............... G06Q 20/386 |
| 2016/0280149 A1 | 9/2016 | Nakano |
| 2016/0308957 A1 | 10/2016 | Zhang et al. |
| 2016/0328550 A1 | 11/2016 | Pritchard et al. |
| 2016/0350096 A1 | 12/2016 | Pipilas et al. |
| 2016/0352673 A1 | 12/2016 | Flores et al. |
| 2017/0031874 A1 | 2/2017 | Boudville |
| 2017/0046173 A1 | 2/2017 | Moraes et al. |
| 2017/0243208 A1* | 8/2017 | Kurian .................. H04L 9/3236 |
| 2017/0302663 A1 | 10/2017 | Nainar et al. |
| 2018/0139056 A1 | 5/2018 | Imai et al. |
| 2018/0167198 A1* | 6/2018 | Muller ..................... G06F 21/44 |
| 2018/0253452 A1* | 9/2018 | Callan ....................... H04L 9/14 |
| 2019/0013948 A1* | 1/2019 | Mercuri ............. G06Q 20/3827 |
| 2019/0036906 A1* | 1/2019 | Biyani .................. H04L 63/102 |
| 2019/0253434 A1 | 8/2019 | Biyani et al. |
| 2019/0297101 A1 | 9/2019 | Dhakshinamoorthy et al. |
| 2019/0312877 A1 | 10/2019 | Zhang et al. |
| 2019/0386969 A1 | 12/2019 | Verzun et al. |
| 2020/0126050 A1 | 4/2020 | Savolainen |
| 2021/0144149 A1 | 5/2021 | Simons |
| 2021/0342836 A1 | 11/2021 | Cella et al. |

FOREIGN PATENT DOCUMENTS

| | | |
|---|---|---|
| CN | 108737348 A * | 11/2018 |
| WO | WO 2014210330 | 12/2014 |
| WO | WO 2019222898 | 11/2019 |

OTHER PUBLICATIONS

[No. Author Listed] [online], "Blockchain for IoT Security and Privacy," Csiro Distributed Sensing Systems Group, dated Apr. 20, 2017, retrieved on Dec. 16, 2021, retrieved from URL <https://research.csiro.au/dss/blockchain-iot-security-privacy/>, 13 pages.

Cirani et al., "An Oauth-based Authorization Service Architecture for Secure Services in iot Scenarios," IEEE Sensors Journal, 15(2), pp. 1224-1234, pp. 1-12, dated Feb. 2015, 12 pages.

Dixon, C., Mahajan, R., Agarwal, S., Brush, A.J., Lee, B., Saroiu, S. and Bahl, P., Apr. 2012 "An operating system for the home," Proceedings of the 9th USENIX conference on Networked Systems Design and Implementation, USENIX Association, (Year: 2012), 16 pages.

Dixon, C., Mahajan, R., Agarwal, S., Brush, A.J., Lee, B., Saroiu, S. and Bahl, V., "The home needs an operating system (and an app store)," Proceedings of the 9th ACM SIGCOMM Workshop on Hot Topics in Networks, ACM, Oct. 2010, 6 pages.

https://nest.com/works-with-nest; retrieved from Wayback Machine on Sep. 25, 2019 (<https://web.archive.org/web/20150112044821/https://nest.com/works-with-nest/>); Jan. 12, 2015, 5 pages.

Tschofenig, "The Oauth 2.0 Internet of Things (IoT) Client Credentials Grant," Work in Progress, 66, dated Jul. 4, 2014, 10 pages.

Yegulap, "There's a (cloud) app for that: Microsoft adds store to Azure," Info World, dated Jul. 15, 2014, 4 pages.

Zhang et al., "Proximity based IoT device authentication," IEEE Infocom 2017—IEEE Conference on Computer Communications, 2017, pp. 1-9.

\* cited by examiner

DEVICE MANAGEMENT AND SECURITY THROUGH A DISTRIBUTED LEDGER SYSTEM

CROSS-REFERENCE TO RELATED APPLICATION

This application is a continuation application of and claims priority under 35 U.S.C. § 120 to U.S. application Ser. No. 16/505,945, filed on Jul. 9, 2019, which claims priority under 35 U.S.C. § 119 to U.S. Application Ser. No. 62/696,209, filed on Jul. 10, 2018, and entitled "Device Management and Security Through a Distributed Ledger System," the entire contents of each of which are incorporated by reference herein.

BACKGROUND

The Interconnected devices, sometimes referred to as the Internet of Things (IoT), includes a network of physical objects (referred to as IoT devices) embedded with electronics, software, sensors and connectivity to enable it to achieve greater value and service by exchanging data with the manufacturer, operator and/or other connected devices. Each IoT device is uniquely identifiable and is able to interoperate within the existing internet infrastructure.

SUMMARY

Implementations of the present disclosure are generally directed to managing the operation of devices, controlling access to the devices, and ensuring the security of the devices and/or data generated by the devices. More particularly, implementations of the present disclosure are directed to use of a distributed ledger system to manage device operation, control access to devices, and provide device security, through use of smart contracts that execute (e.g., on the distributed ledger system) to apply access control rules, establish device-to-user relationships, enforce digital identity-based authentication for users, devices, and/or access entities, and/or perform other operations related to the devices.

In general, implementations of innovative aspects of the subject matter described in this specification can be embodied in a method that includes the following operations: receiving a request, from a requesting entity, to access information associated with an internet-of-things (IoT) device; responsive to the request, applying at least one rule to verify that the requesting entity is authorized to access the information, wherein the at least one rule is stored on a distributed ledger system (DLS); and responsive to verifying that the requesting entity is authorized to access the information, providing the requesting entity with access to the information which is stored on the DLS.

These and other implementations can each optionally include one or more of the following innovative aspects: the requesting entity includes one or more of a user application, an IoT device provider, a third party entity, and another IoT device; the information is data generated by the IoT device; the information is command and control information for managing the IoT device; the at least one rule is included in at least one smart contract that executes on the DLS; verifying that the requesting entity is authorized to access the information is based at least partly on identity information for the requesting entity that is stored on the DLS; the IoT device is included in an IoT platform that communicates with the DLS; the IoT platform communicates with the DLS independently of the IoT device which does not communicate directly with the DLS; and/or the request initiates bidirectional communications between the requesting entity and the IoT device, during which at least one command from the requesting entity is sent to the IoT device, and during which data generated by the IoT device is sent to the requesting entity.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
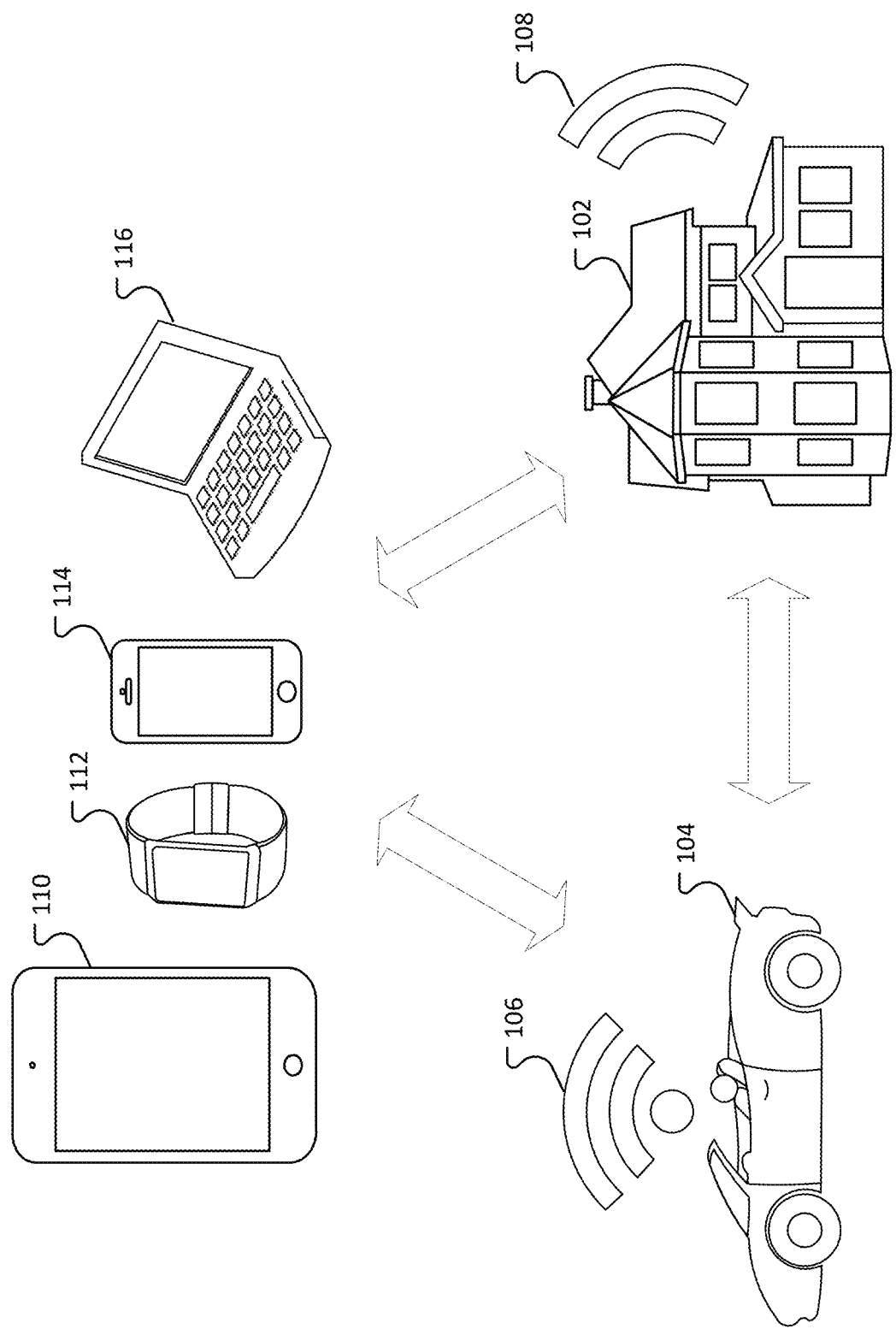
FIG. 1 illustrates an example of an environment include interconnected devices.

Implementations of the present disclosure are directed to techniques for managing internet-of-things (IoT) devices.

Device management can include, but is not limited to, one or more of the following: managing the storage of data generated by the IoT devices; managing the access, to the data, by users, processes, and/or other entities; managing command and control of the devices; managing associations between devices; managing associations between users and devices; managing associations between device providers and devices; managing the addition of new devices to an IoT; managing the removal of devices from an IoT; and/or managing other aspects related to IoT devices.

In some implementations, an IoT platform is provided for IoT device management, and the IoT platform can be agnostic with respect to providers. For example, the IoT platform may provide one or more common interfaces that enable communications with IoT devices that are manufactured by different device providers. In some implementations, a distributed ledger system (DLS) is employed to facilitate IoT device management. For example, the DLS can act as a gateway and/or overall interface to control access of users, processes, devices, IoT device providers, and/or other entities to the IoT devices and/or to an IoT platform. Each of these scenarios is described further below.

Traditionally, IoT devices are configured to support a proprietary protocol that can be specific to the particular device provider (e.g., device manufacturer or seller). Accordingly, different IoT devices from different providers can support different protocols for communication, command and control, data access, and so forth. This can lead to a lack of device-to-device compatibility within an IoT that includes devices from different providers, making it difficult to manage devices of different providers. Such variety can also lead to inconsistency in data security, access control, authentication, and/or other aspects.

Implementations described herein address these problems by provider, in some instances, an IoT platform that is agnostic with respect to device provider. Moreover, in some implementations, a DLS can be used for home, commercial, and/or other types of IoT environments, to provide data security as well as security for interactions between users and devices, and/or interactions between devices to external entities (e.g., device providers, third party services, etc.). The DLS can also be employed for user and/or device identity management, and/or to provide self-sovereignty and access control of IoT-based transactions (e.g., through use of smart contract(s)). In some instances, the DLS can interact with an IoT platform that is device provider agnostic. In some instances, the IoT devices themselves can interact with the DLS (e.g., for IoT devices that are "blockchain intelligent), for example through use of blockchain(s) and/or IBM Hyperledger, Bluemix stack, and/or other suitable technologies. A DLS can be automotive-connected and -enabled, for storage of telematics data and/or other vehicle-related data on the DLS for streamlining applications and/or other aspects. In some examples, financial services (e.g., banking, insurance, investment, etc.) can leverage IoT to expand services, provide heightened data security, ensure auditability, and/or other aspects.

In some implementations, the DLS includes one or more blockchains. A blockchain is a public or private ledger of all transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device (or a cluster of multiple devices) that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may know the previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains may also employ other protocols. In this context, the work is a task that is difficult for any single node (e.g., computing device) in the peer-to-peer network to quickly complete, but is relatively easy for a node (e.g., computing device) to verify.

The peer-to-peer network can include so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Other suitable consensus mechanism(s) can also be employed. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency, records of shares or other items, etc.) to be transferred between multiple blockchains. The blockchain may be a public blockchain, such that data stored on the blockchain is generally accessible. The blockchain may be a private blockchain, such that the stored data is accessible only to authorized individuals and/or processes on the blockchain.

FIG. 1 illustrates an example of an environment include interconnected devices. There can be many different kinds of interconnected devices. Examples of IoT devices include devices in a house 102 such as thermostats, washer and dryers, alarm systems, light controls, TV/cable, Internet providers and other smart home features. IoT devices may also include mobile items such as automobiles. IoT devices may also include interaction centers such as fuel stations, banking ATMs, payment kiosks and points of sale. Each of these IoT devices may communicate (via, for example, wireless network signals 106, 108, including but not limited to cellular wireless protocols such as LTE and 4G communication protocols as well as wireless protocols consistent with the 802.11 standards) with one or more controller devices under the control of a user. A controller device may be, for example, a smart phone 114, tablet 110, computer 116, kiosk (not shown), smart watch 112, automotive dashboard (not shown), or any other suitable electronic device. For example, a user may be able to control his thermostat, lights, or automobile using his smart phone or other device.

Figure 2:
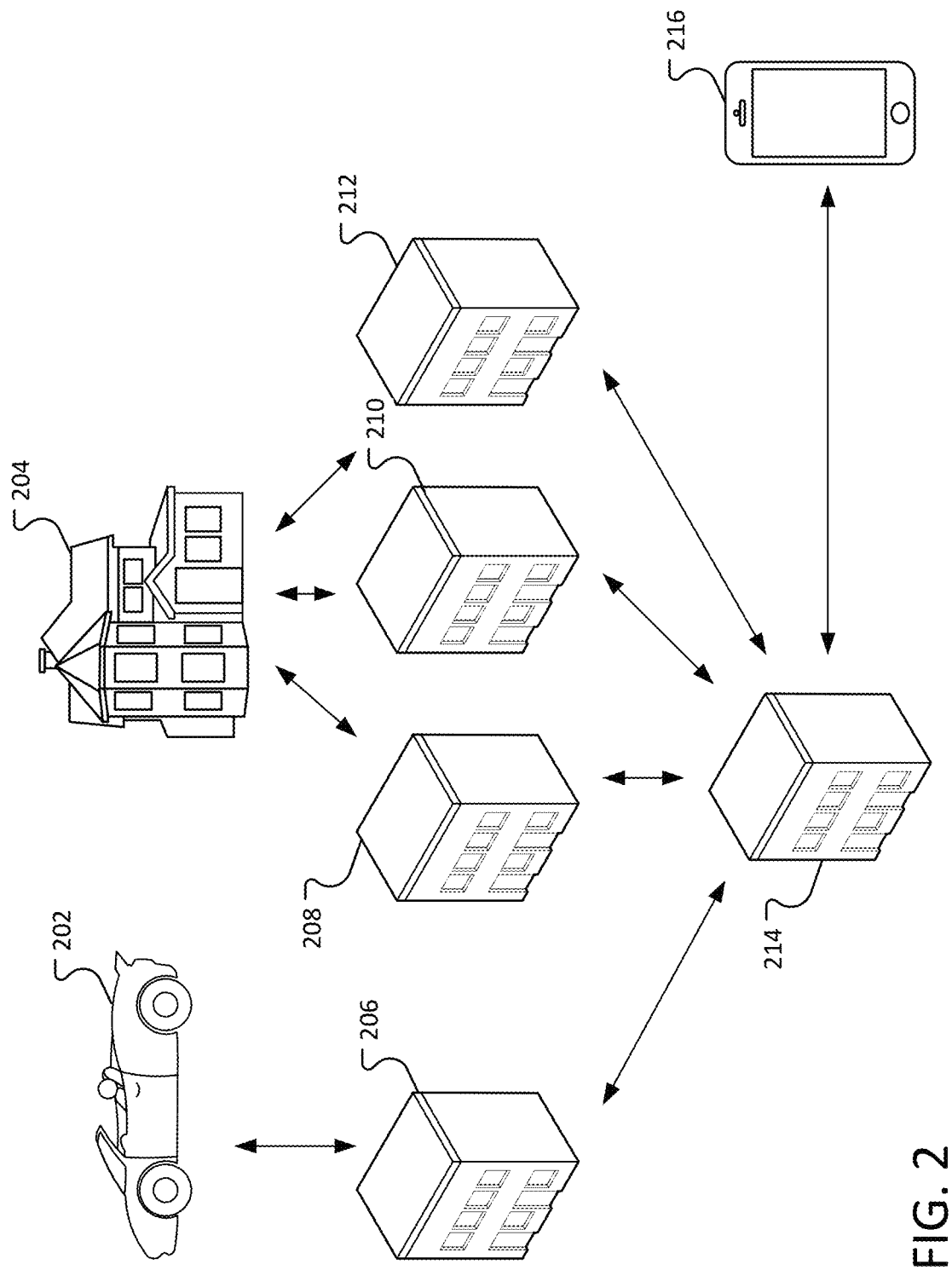
FIG. 2 illustrates an example environment for the internet of things.

FIG. 2 illustrates an example environment for the internet of things. Generally, different IoT devices may be provided by different companies. For example, an automobile 202 may include interconnectivity capabilities supplied by one company 206. A smart home 204 may include many different IoT devices that can each be provided by different companies 208, 210, 212. In general, the IoT devices may have disparate and inadequate security solutions. Whereas previously, technical vulnerabilities were contained to the wireless network, now physical aspects of an individual's home and possessions are vulnerable. For example, a security failure that previously would result in someone having access to your wireless network may now provide access to an alarm system, door locks, or automobile ignition.

A trusted company 214 may mitigate the risks associated with managing the security from disparate companies by providing a security platform to support a common security solution for a variety of different IoT devices. A trusted application executing on a client device 216 can be protected using multifactor authentication, including for example, biometrics, pass codes, pass words, and physical devices. Multifactor authentication generally refers to types of authentication falling into three categories. These categories can be described as something the user has, something the user knows, and something the user is.

The first factor, something the user has, can be secured by limiting which devices are authorized to access the system. For example, a user may be required to register the client devices with the trusted company before the client device can be used to access the system.

The second factor, something the user knows, can include passcodes and passwords entered into an application executing on the client device 216. The passcodes and passwords can be provided to the system in order to provide verification that the user is authorized to use the system.

The third factor, something the user is, can include biometric information. The biometric information can include measurement and analysis of body characteristics of the user (for example, fingerprints, eyes (e.g., retinas and irises.), voice patterns etc.)

Figure 3:
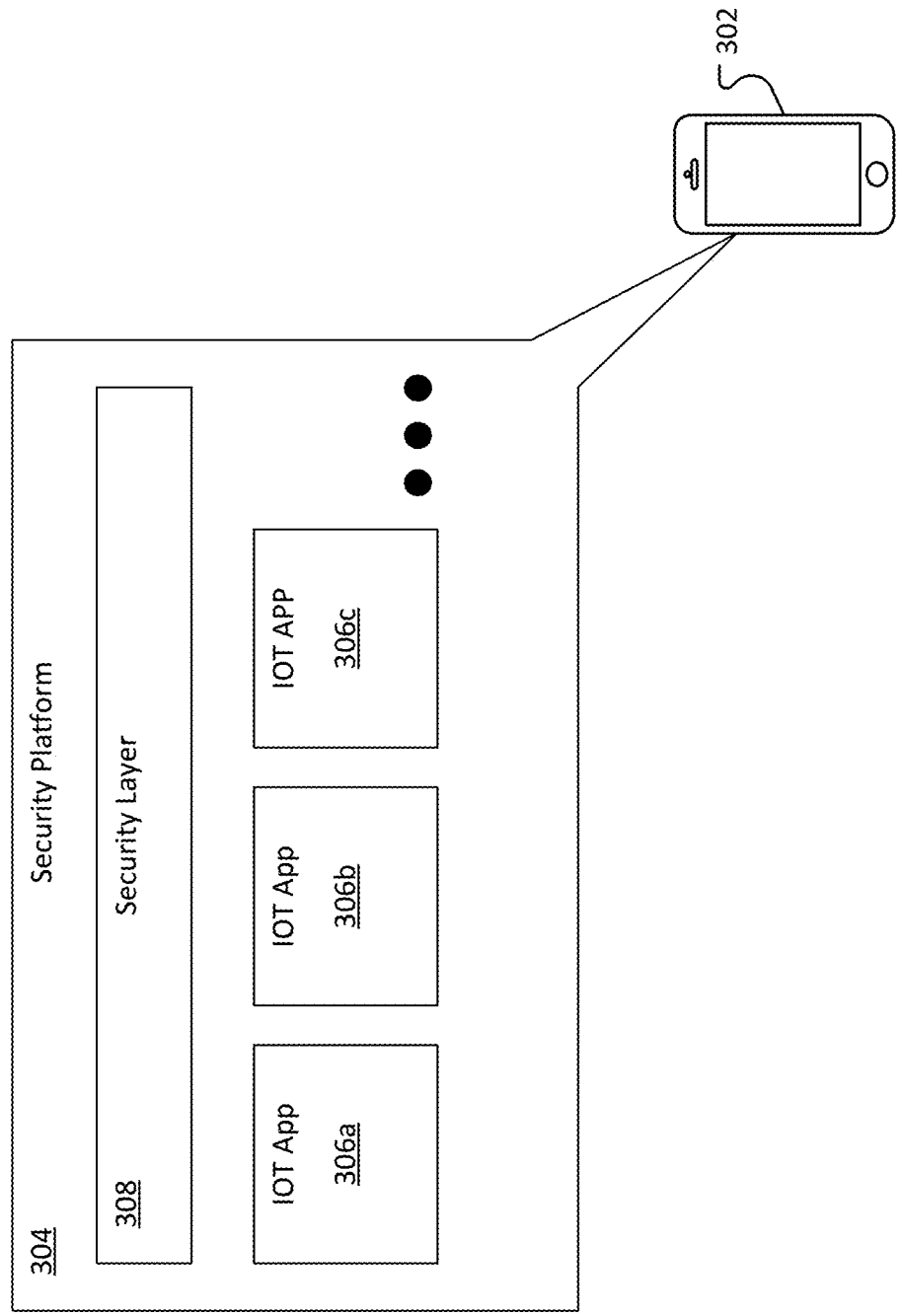
FIG. 3 illustrates an example of different applications integrated into the security platform on a client device.

In some implementations, the proximity between a control device and the IoT device may be used as a 4th authentication factor. The proximity can allow the security framework to do perform a risk assessment, including ground-speed rule violation between IoT devices and location-based behavior profiling. FIG. 3 illustrates an example of different applications integrated into the security platform on a client device. The client device 302 can be executing the security platform 304. The security platform can include a security layer 304 which manages the security of IoT apps 306a-c provided by third parties. The security platform 304 may include a Secure Hub that protects the network from malware, hacking, etc. and blocks unauthorized parties from accessing the system.

A user may authenticate with the security platform 304 on the client device 302. Once authenticated, the security platform 304 may receive and store an authentication token that can be used to authenticate the user to different IoT applications. In general, an IoT application is a software product that is used to control the IoT device. The security layer 308 can provide the authentication token to the IoT Apps 306a-c. The authentication token is accepted by the IoT Apps 306a-c as proof that the user has been authenticated by the security platform 304. In some implementations, the authentication token may be used once, requiring that a user re-authenticates with the framework each time the user accesses an IoT App. In some implementations, the authentication token may be valid for a period of time after authentication, for example 5 minutes, 10 minutes, 30 minutes, etc. . . .

The security platform 304 may be able to securely wipe data from lost or stolen IoT devices. For example, if an IoT device is stolen, the user may be able to log into the security platform and execute a command for an IoT device that causes all data on the device to be deleted. The security platform 304 may also enable a user to track and monitor data/access of an IoT device. The tracking and monitoring of the device can include the ability to determine what is occurring with the IoT device in real-time (for example, what program is currently being displayed on a smart TV) and may also include the ability to review historical activities (for example, the programs that have been displayed on the smart TV over a period of time).

Figure 4:
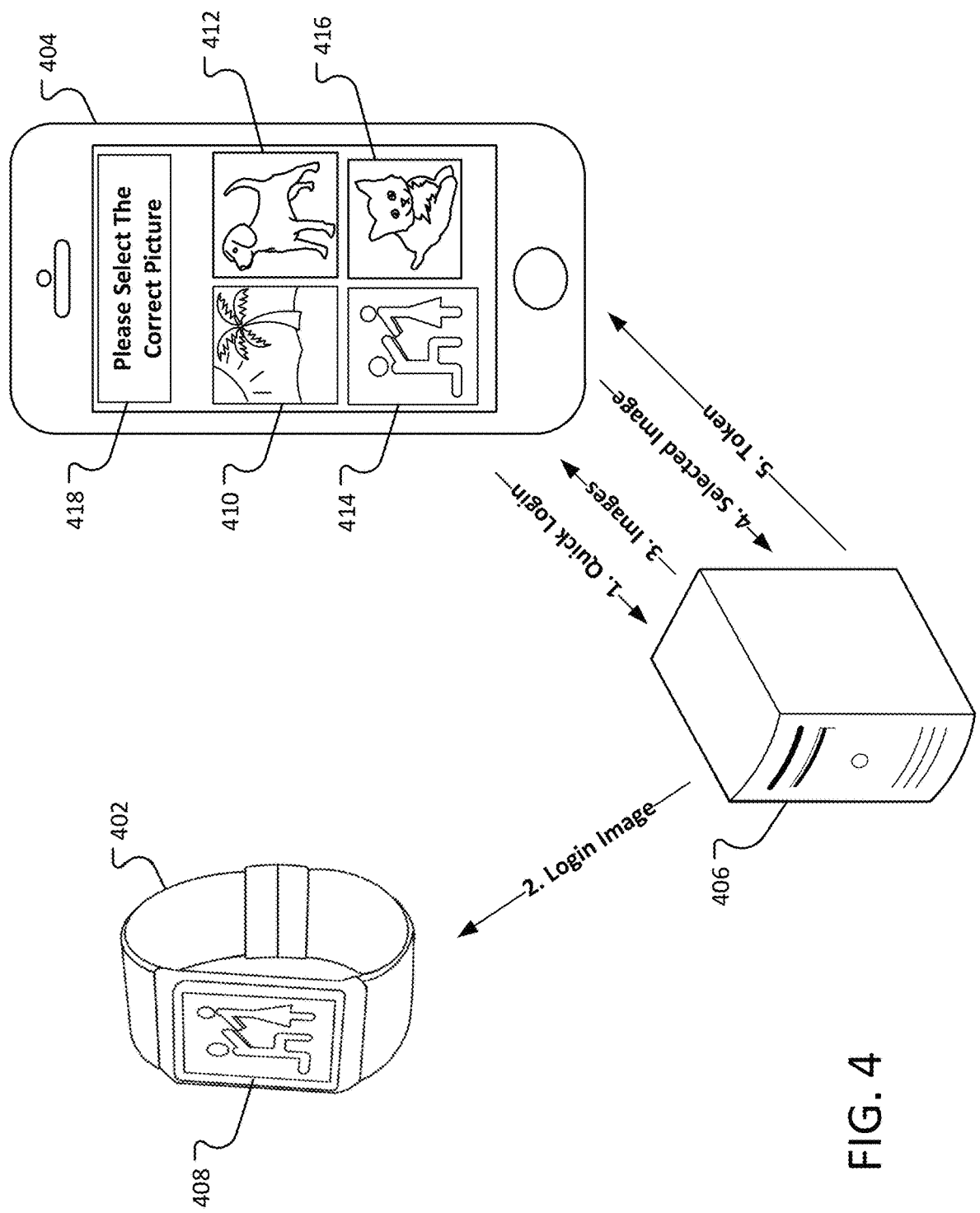
FIG. 4 illustrates an example simplified login process.

In some implementations, a user logged in with one user device may be able to perform a simplified login process to login on a second user device. FIG. 4 illustrates an example simplified login process. Although the example is described using a smart phone 404 and a smart watch 402 other client devices can be used, as described above.

In this example, a user may be logged in with a smart watch 402. The user wishes to log in with their smart phone 404. The smart phone sends a quick login (or alternatively, a general login request) to a computer system 406 that manages the login process. The computer system 406 determines that the user is already logged in using the smart watch 402. The computer system 406 sends an image 408 (in this example, an image of a couple) to the smart watch 402. The computer system 406 also sends a group of images to the smart phone 404. (in this example, images 410, 412, 414, 416). Although four images are shown in the figure more of fewer images may be provided.

The user interface of the smart phone 404 displays a message 418 requesting the user select the correct picture. The user interface also displays the received images. In this example image 410, 412, 414, and 416. The user selects an image and the selected image is provided to the computer system 406.

If the user selects the image that matches the image on the smart phone 404 displayed on the smart watch 404 then the computer system logs the user in on the smart phone 404 and sends an authentication token, as described above.

If the user does not select the image that matches the image on the smart phone, the login request is denied.

In some implementations, the quick login process may require additional credentials. For example, the user may be requested to enter a numeric passcode. Entering the passcode is generally considered quicker and easier than entering a complete alphanumeric password.

Once the user logs into the security platform, the user can be presented with a list of installed applications. The applications may be organized under a subheading, such as, "IoT Applications" or "Home Automation."

Figure 5:
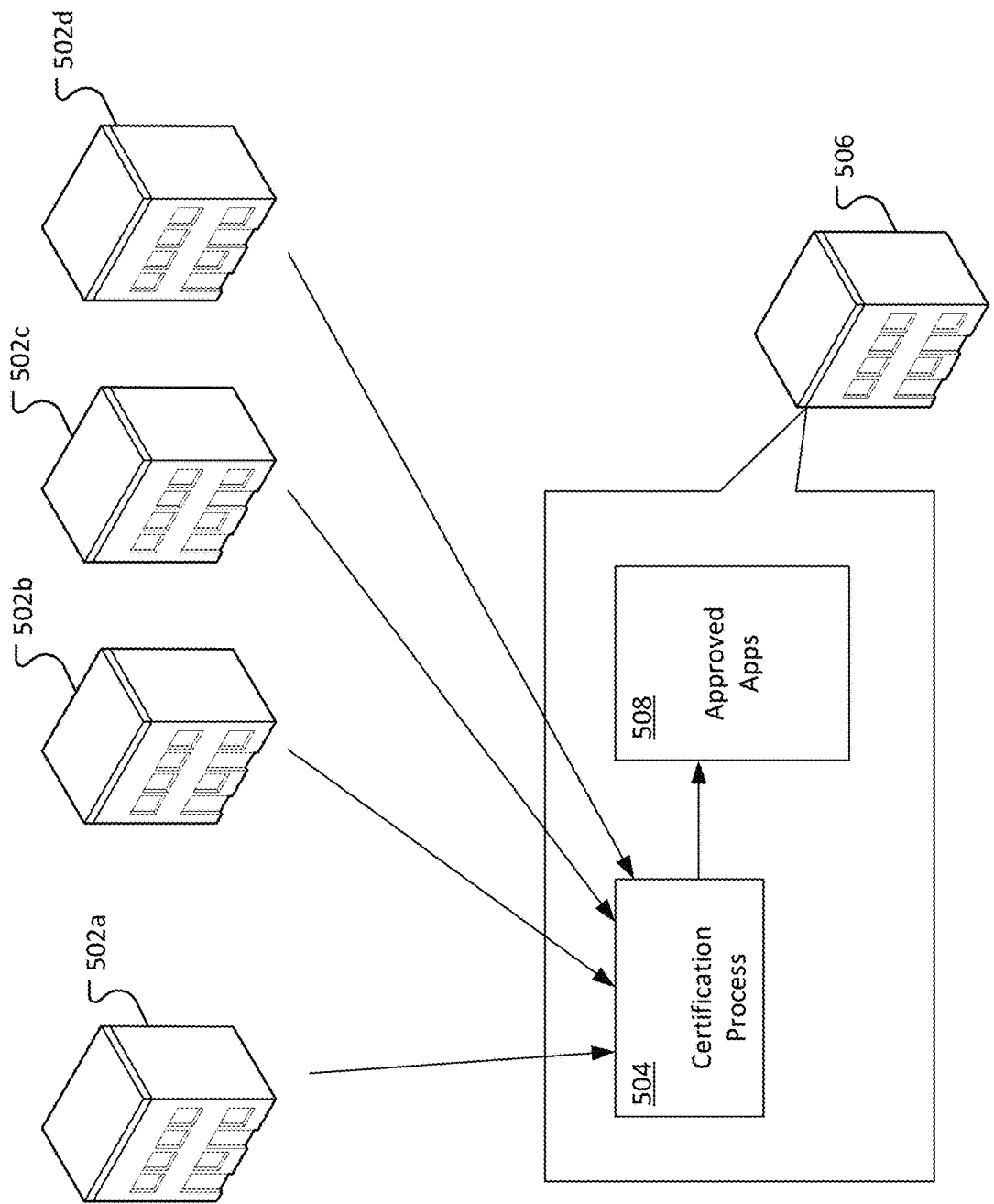
FIG. 5 illustrates an example of integrating IoT vendor apps with the security platform.

FIG. 5 illustrates an example of integrating IoT vendor apps with the security platform. The security platform may be configured to provide integrated security for IoT devices provided by multiple companies.

IoT applications may be provided by multiple companies 502a-d (for example, IoT vendors) for certification as compatible with the security platform. A certification process can check that the IoT applications accept the authentication token as a form of authentication and that the IoT applications provide a minimum security protection required by the security platform.

In some implementations, minimum security protection can include the ability to provide a verifiable assertion of identity to the client device (for example, the security platform and the client device should be able to verify that messages sent from the IoT device originate at the IoT device). The minimum security protection can also include the ability to restrict activities with the IoT device based on user authorization (for example, features of the IoT device may be able to be restricted based on the user who accesses the device). The minimum security protection can also include that communications with the IoT device are secure and protected and that a notification is available to the client device that the connectivity is secure and protected. The minimum security protections can also include a verification that the application has been approved for use within the platform.

When an application has been certified it can be added to a list of approved apps 508. New applications may be obtained by a user from a specialized application store, a specialized part of an app store, or from a general purpose app store. The applications may be tagged with a tag that indicates that the app has been certified (for example, the applications may be tagged with the phrase "Secure IoT Framework Compliant") for easy identification.

Figure 6:
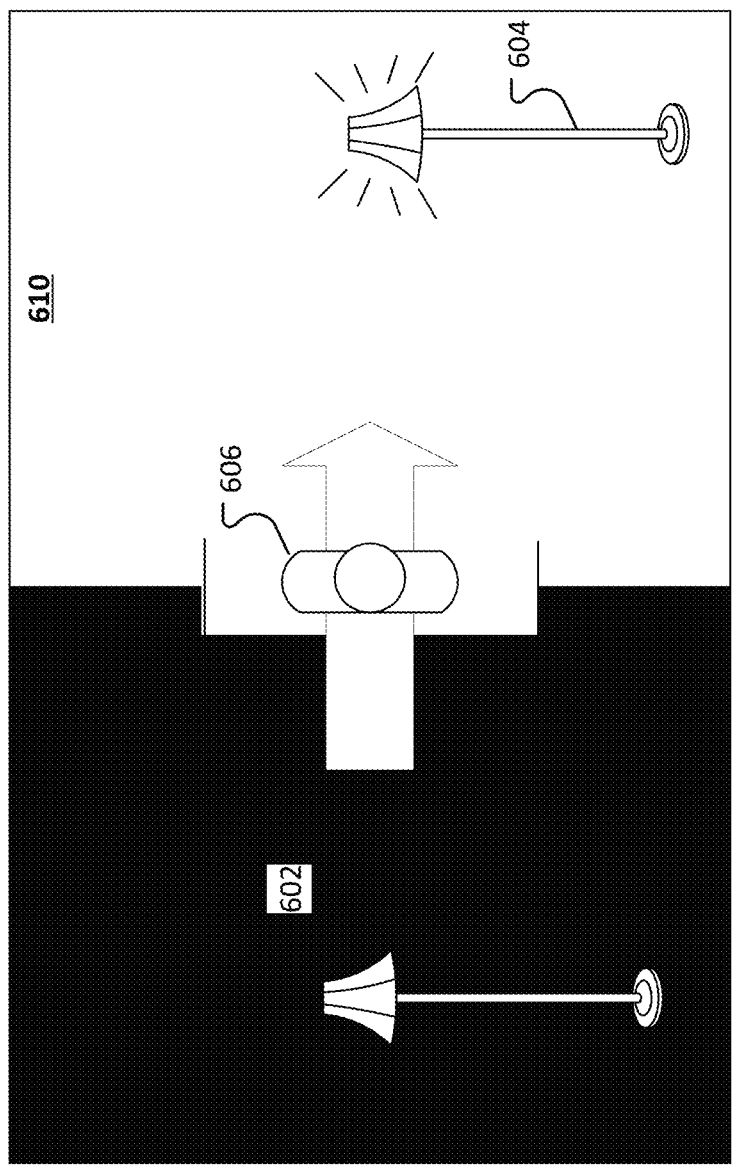
FIG. 6 illustrates an example of a location device on a client device interacting with IoT devices.

FIG. 6 illustrates an example of a location device on a client device interacting with IoT devices. In some implementations, the security platform enables advanced control of IoT devices via the IoT applications installed on client devices. For example, the client device may include an integrated GPS positioning system. The security platform on the client device may use the location of the user's client device to determine actions to cause the IoT devices to behave in a desired manner.

In this example, as the user 606 moves from one area 608 to another area 610, the client device shuts off the light 602 and turns on the light 604. Therefore lights may turn on and off as the user moves through the smart home. Other items may also be controlled. For example, the system may determine what music to play.

In some implementations, the security platform can also enable controlling the IoT device based on the time of day. For example, a user may prefer one type of music in the morning and another type of music in the evening. Certain lights in the house may be turned on or off based on the time. The security platform may automatically set a house alarm and close the garage door at a particular time. The security platform may pre-start a car in the morning so the temperature is comfortable when the user drives to work.

In some implementations, the security platform can control IoT devices based on information or events received from other IoT devices. For example, the security platform may receive an indication that the user's morning alarm has been turned off and may therefore start coffee brewing in a coffee maker.

The security platform supports the full life cycle of IoT device ownership, from the time the IoT device is installed until the time the IoT device is removed. When a user obtains a new IoT device, the user can download the corresponding IoT application from the app store and install the IoT application within the security platform. In some implementations, the security platform may communicate information about the user (with the user's permission), which is sufficient to register the user with the IoT device. In some implementations, the user may register with the IoT device directly and subsequently associate the registered IoT device with the security platform. Once registered, the user can control the IoT device using the IoT app executing within the security platform.

When an IoT device is removed, the user informs the system that the device has been removed. The security platform deletes the device and updates records indicating that the device is no longer available.

The security platform may also allow users to delegate authority to other users. For example, members of the household may be granted access to control the television. In some implementations, different users may be granted different levels of authority. For example, spouses may have full control over all IoT devices in the household, however, children may be granted only limited access to some of the devices (for example, children may be granted access to control the television but not be granted access to start a car or change the thermostat).

The security platform may allow the user to have multiple controller devices. For example, a user may own a smart phone, a tablet, a computer, or other controller devices. The security platform may associate each of the controller devices with the user.

In some implementations, device ownership (both controller and IoT devices) and permissions can be managed using blockchain technology. A blockchain is a public or private (e.g., permissioned) ledger of all transactions related to a domain that have ever been executed. The chain grows as completed blocks of recordings are added to the chain. Blocks are added to the chain in a linear chronological order. The chain can be shared by all the nodes that participate in the security platform. For example, the chain can be shared with one or more controller devices. The chain can also be shared with backend systems. Each block in the blockchain includes a hash value determined from the previous block in the blockchain. The hash value can be used to ensure that the blockchain has not been tampered with or altered.

A blockchain can be used to track IoT device ownership. For example, the blockchain may indicate that a user purchased a NEST thermostat. A later block may indicate that the user purchased an X10 home security system. A later block may indicate that the user removed the NEST thermostat.

A blockchain can be used to track the assignment of permissions to different users. For example, a block in the blockchain may indicate that a user has granted full permissions to all IoT devices to his spouse. A block in the blockchain may indicate that the user has granted permission to his daughter to drive the car. A later block in the blockchain may indicate that the user has revoked the permissions of the daughter to drive the car (for example, if the child is grounded). A later block may show that the permissions of the daughter to drive the car were re-granted.

A blockchain can be used to associate ownership of controller devices. For example, a block in the blockchain may indicate that a user has obtained a smart phone. When the user goes to control an IoT device using the smart phone, the blockchain may be analyzed to determine whether the ownership of the smart phone is recorded in the blockchain and has not been removed. If the smart phone is owned by the user, then the security platform may provide access to the IoT devices through the smart phone, however, if the blockchain indicates that the smart phone has been removed from the chain (for example, sold or replaced) then the security platform may deny access to the smart phone.

A blockchain can be used as a vehicle for device-to-device interaction, verification and command execution. For example, an attic fan can receive trigger from an attic temperature sensor, validate the chain to ensure this is trusted, and actually have a 'smart contract' to execute an operation for the fan to turn on.

A blockchain can track and propagate authorized level of access between devices. For example, if a user has limited access control within the IoT framework, and the user interacts with device A, then blockchain can propagate the limited control to device B, to device C and so on, so that the user does not get complete control on devices B and C.

A blockchain can be used for tracking partner interactions with the security framework. This could indicate what IoT devices came into/went out of the security framework, payment and other liabilities that are associated with this, etc.

A blockchain can contain the IoT device 'signature.' The signature in the block chain provides as a verifiable method of identifying what constitutes an IoT device (for example, a smart coffee maker and all its parts can have a signature on the blockchain). The signature can be verified to identify a trusted IoT component/device that gets into the ecosystem and identify fraudulent/hacked devices from entering.

In one example, information that may be stored in the blockchain for a vehicle includes the identity of user and vehicle (such as ownership/co-ownership, lease/own identification, documents, e-signatures, add-ons (trim, navigation system, video, etc), VIN/year/make/model, fuel type, grade, vehicle registration, vehicle inspection, driver's license, insurance documents, vehicle sharing, vehicle sale). The information may include vehicle one-time and/or recurring costs (such as vehicle purchase, vehicle loan, vehicle insurance, vehicle maintenance, vehicle repair, tow truck fees, claims settlements). The information may include transactions performed on the vehicle (such as, fuel purchase, insurance payment, loan payment, maintenance/repair payment). The information may include information about driving performance (such as a performance score, environment friendly, and fuel efficiency). The information may include information about roadside assistance. The information may include information about emergency contact information.

Figure 7:
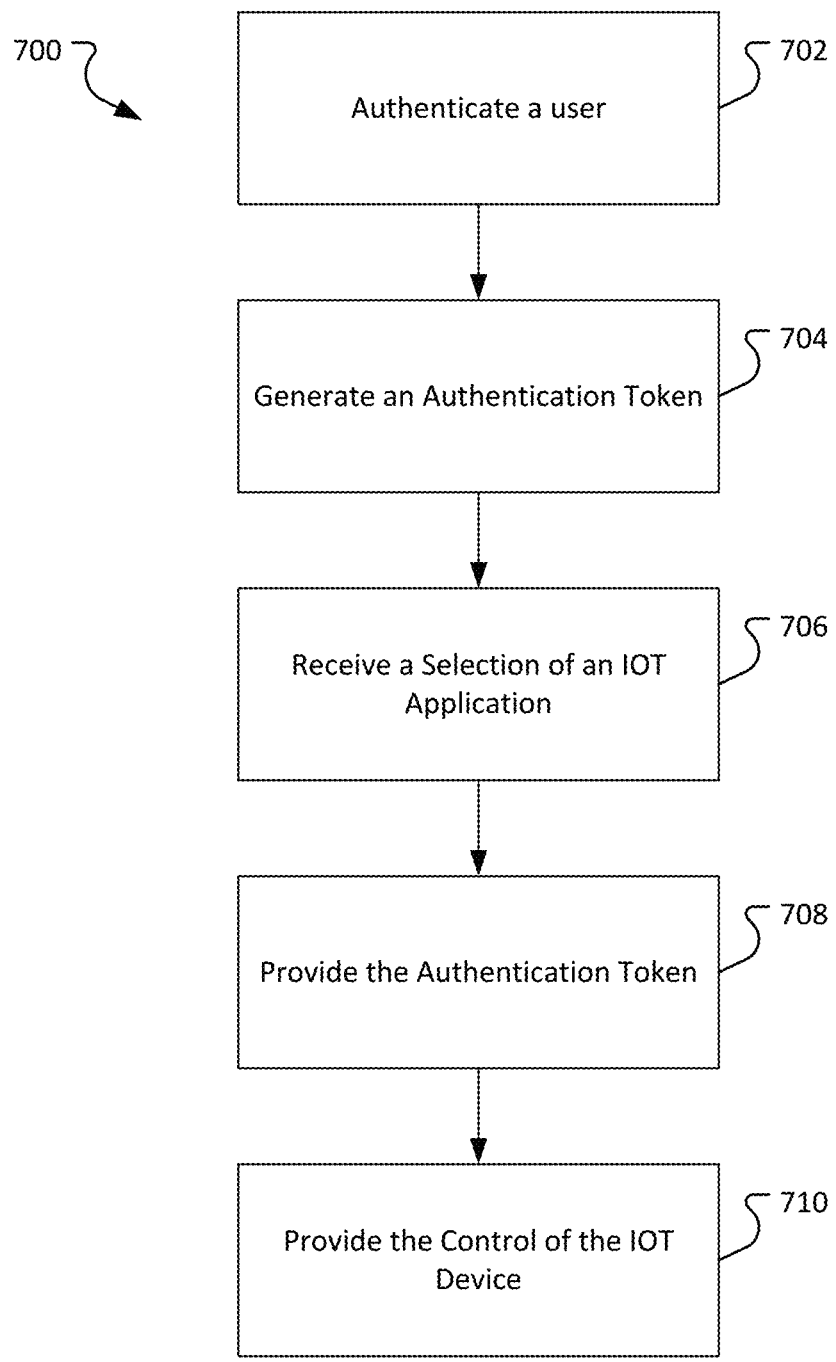
FIG. 7 is a flowchart of an example process of accessing an IoT application using a security platform.

FIG. 7 is a flowchart to of an example process of accessing an IoT application using a security platform. The process may be performed by a computing device, for example, a server or similar system.

The process authenticates a user 702. The user may be authenticated based on a multifactor authentication process or using a quick authentication process, as described above.

The process generates an authentication token 704. The authentication token may be a random or cryptographically generate string of characters. For example, the authentication token may be a string of characters digitally signed by a private encryption key associated with a server or authentication process. The authentication token may be generated by a server or by a client device. In some implementations, the token may be generated and supplied by a third party provider.

In some implementations, verification of the user may occur on the client device and a federated identity is passed to a server, to an application store, and to the IoT applications. Federated identify may refer to methods of linking a person's electronic identify and attributes, stored across multiple systems. It can include, for example, the distribution of a token verifying the identity of the user across multiple systems.

The process receives a selection of an IoT application 706. Once authenticated, IoT applications may be presented for selection on a user interface of a client device. The user may select the IoT application by selecting the desired IoT application.

The process provides the authentication token 708. The authentication token can be provided to the selected IoT Application. The IoT application can verify the authentication token, for example, by verifying that the digital signature is authentic, or through other means.

The process 710 provides control of the IoT device. Once authenticated the IoT Application allows the user access to the IoT device consistent with the functionality of the IoT application.

Figure 8:
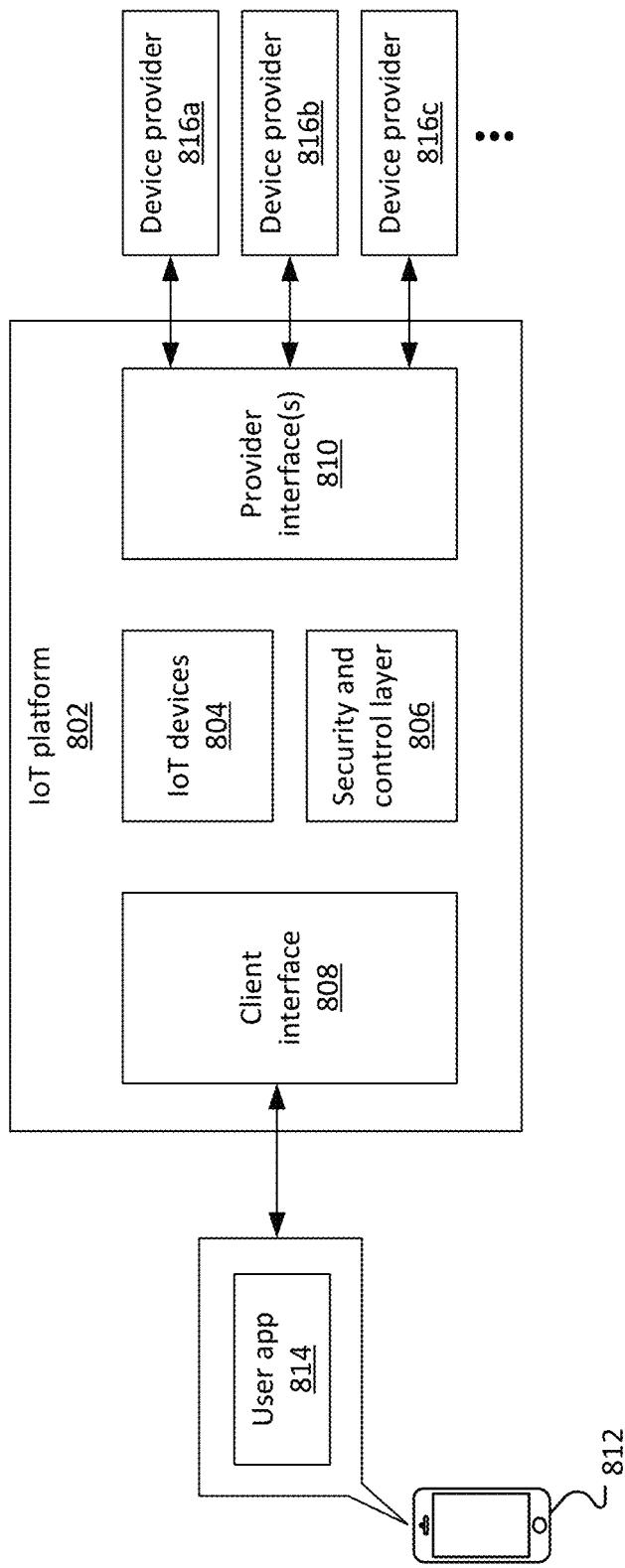
FIG. 8 illustrates an example system, including a platform for provider-agnostic access to IoT devices.

FIG. 8 illustrates an example system, including a platform 802 for provider-agnostic access to IoT devices. As shown in the example, the system can include an IoT platform 802

(also referred to as the platform or the security platform above). The platform 802 can include and/or support any suitable number and type of IoT devices 802. The platform 802 can also include a security and control layer 806, a client interface 808, and one or more provider interfaces 810. The client interface 808 enables communications between the IoT platform 802 and a user application 814 (user app) executing on a user device 812, which can be any suitable type of computing device. The provider interface(s) 810 enable communications between the IoT platform 802 and device providers 816. The device providers 816 may be different companies (e.g., manufacturers and/or sellers) associated with the IoT device(s) 804. The IoT platform 802 can include IoT devices 804 that are associated with different device providers 816.

The platform 802 can be a device provider agnostic platform that can communicate with different device providers through the various provider interfaces 810. For example, the interfaces 810 can include an interface that is particular configured to communicate with a particular device provider 816.

The client interface 808 can provide a single interface from the user app 814 to the platform 802. In some examples, the user app 814 is responsible for managing the identity and authentication of a user, to ensure that the user is authorized to access the platform 802. The client interface 808 can provide a device agnostic interface (e.g., API) to access the platform 802. In some implementations, the user app 814 provides functionality for device onboarding, to enable a user to request that a new IoT device 804 be added to the platform 802 for managing through the platform 802. Onboarding can set up an association between the user and the IoT device in the platform 802.

In some implementations, the IoT platform 802 provides built-in device-to-device association rules, and/or topic-based user-to-device command and control orchestration. Device data and notifications can be channeled via the IoT platform 802, and user consent may be received to control the access of data providers or other entities to the data generated by the IoT devices (e.g., access through the provider interface(s)). The provider interface(s) 810 can control access of device provider 816 systems to the IoT platform 802, and can control data usage by device provider(s).

User identity can be verified by the user app 814 provider and the user can be authenticated through credentials (e.g., login, password, PIN, etc.) and/or other information (e.g., biometric data) provided by the user through the user app 814 and verified by the app provider. IoT devices 804 added to the user app 814 can be associated with the user in the IoT platform 802. IoT platform rules can be set up to handle the (e.g., fine-grained) access control between user and IoT devices. Device data and notifications from device provider(s) 816 (e.g., provider cloud(s)) can be communicated via the provider interface(s) 810 to the platform 802. The platform 802 can communicate with the user app 814 via the (e.g., normalized) client interface 808 that enables access to IoT devices and/or device data associated with different providers.

In some examples, the user can provide consent via OAuth or some other suitable authorization/authentication mechanism. The platform 802 can, in some instances, enforce limited access to IoT device data for device providers, e.g., based on user-provided consent rules and/or contextual information. The platform 802 can provide security for commands, access control, data sharing, and/or other aspects.

Although the example shows a single IoT platform, implementations are not so limited. In some instances, multiple IoT platforms can be present. The client interface 808 can provide a common interface (e.g., API) for communications between user device(s) 812 and one or more platforms 802, and can enable the user to have a single point of interface to communicate with any provider's IoT device(s), with interface capabilities normalized across devices of different providers. The common interface 808 enables application developers to develop user apps that communicate with the common interface 808, instead of requiring apps to communicate with different provider-specific interfaces, and requiring different apps for communicating with different provider-specific interfaces. The platform allows for a secure authentication mechanism for accessing the various IoT devices, which can employ a federated security model. In some implementations, command and control orchestration can be provided through use of secure tokens. For example, when a thermostat or other IoT device is sent a command, the platform 802 ensures that the command is received from an authenticated user's user device 812 as described above.

The platform 802 enables the device providers 816 to send notifications and/or other information to the user device 812 via the interfaces 810 and 808. The platform 802 also enables IoT data to be shared with third parties (e.g., sharing water leak sensor data with an insurance company, etc.) based on data access consent decisions made by the user through the user app 814 and stored in the platform 802. The user can have control over what particular data is shared with which entities (or types of entities), at a suitable level of granularity. Data access rules can be contextual, such as rules governing data access in particular circumstances (e.g., date, time, location, situation, accessing entity, accessed data, etc.). The platform 802 can also provide controls that enable monetization of data access.

Figure 9:
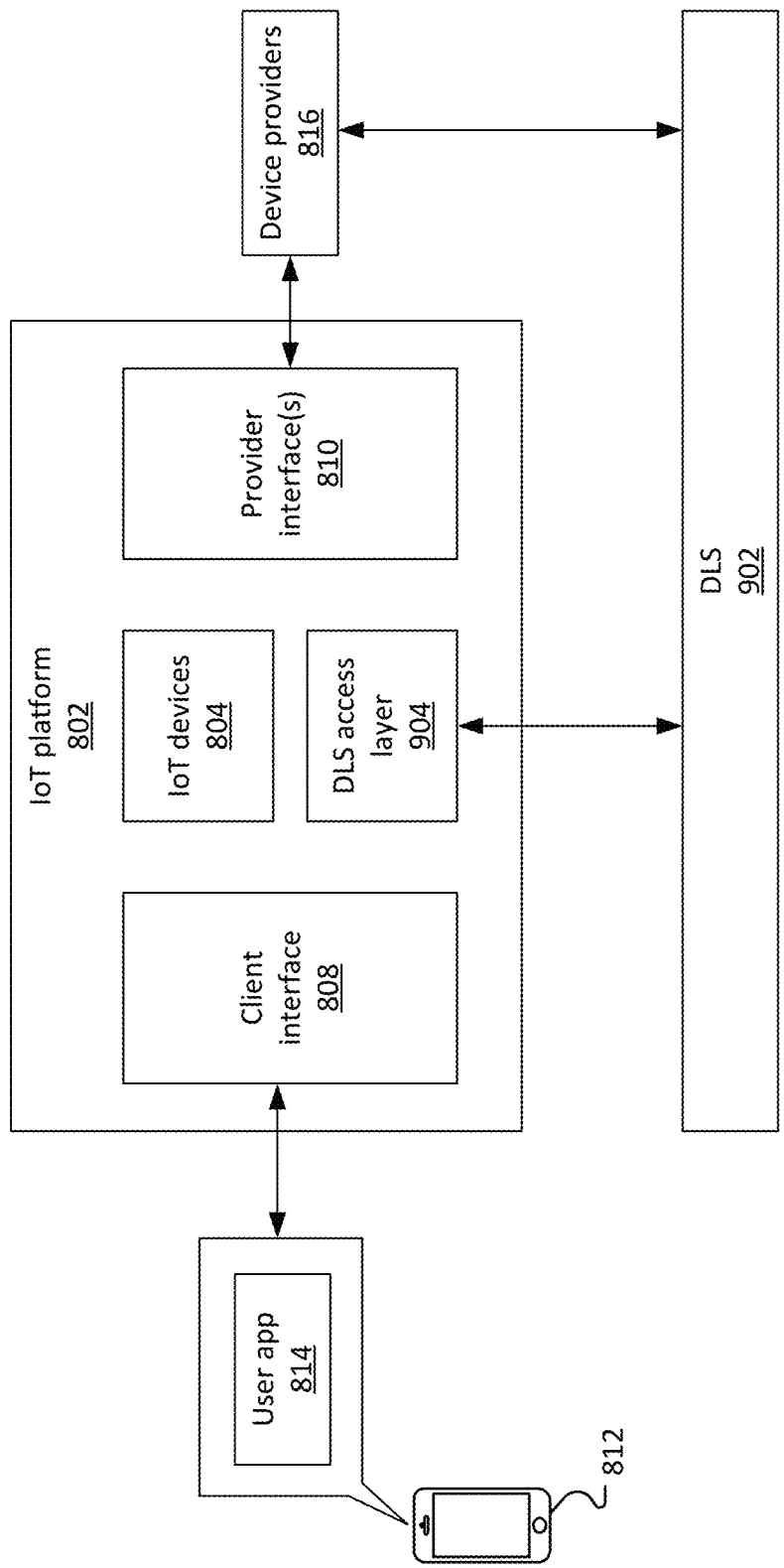
FIG. 9 illustrates an example system, including a distributed ledger system for IoT device management, security, and access control.

FIG. 9 illustrates an example system, including a DLS 902 for IoT device management, security, and access control. The system can include one or more IoT platforms 802, such as described above. In this example, the platform 802 can include a DLS access layer 904 that enables communications between the platform 802 and the DLS 902. The device providers 816 can access the DLS 902 to access the data stored thereon.

The DLS 902 can store one or more of the following: digital identity data for users, user-to-IoT device association information, smart contract(s) that apply user-to-IoT device access rules, user consent information for device data, rules applied to control consent and revocation of consent, smart contract(s) for data access and consent rules, and/or audit tracking information for IoT device interactions and rules.

The user app 814 can access the platform 802 via the device agnostic interface 808, as described above. The app can be responsible for authentication of the user and, in this example, can leverage user identity information stored on the DLS 902. The IoT device onboarding features of the user app can set up user-to-IoT device association data on the DLS 902.

In some implementations, the IoT platform 802 supports DLS-driven (e.g., blockchain-driven) command and control and/or data orchestration. Device data and notifications can be channeled via the IoT platform 802, and the DLS can store user consent rules for data privacy and ownership. The DLS can also store digital identity of users, smart contract for user-to-device access rules, user-to-devices associations, user consent for device data, revocation of consent, smart contract for data access and consent rules, and/or audit tracking for IoT interactions and rules.

The provider interfaces 810 can provide access for device providers 816 to the IoT platform 802 as described above, with DLS-driven user consent controlling data usage and device access for the providers. User identity can be managed by the DLS, and the user app can authenticate the user based on the user identity data on the DLS. IoT devices added to the platform 802 through the user app can be associated with the user on the DLS. The DLS smart contract sets rules to handle the (e.g., fine-grained) access control between user and devices. The IoT platform 802 can perform command and control operations through execution of the DLS smart contract(s). The device data and notifications from the device provider(s) can flow via the provider interface(s) 810 to the IoT platform 802, and the IoT platform 802 can forward data to the user app via the normalized interface 808 as described above.

In some implementations, user consent for data is stored on the DLS, to provide greater control for the user with respect to entities access the IoT data on the DLS. Device provider participation on the DLS can provide for tighter control of data ownership, control, and/or privacy. Implementations can leverage the tracking, auditability, cryptography, and/or other capabilities of the DLS.

Figure 10:
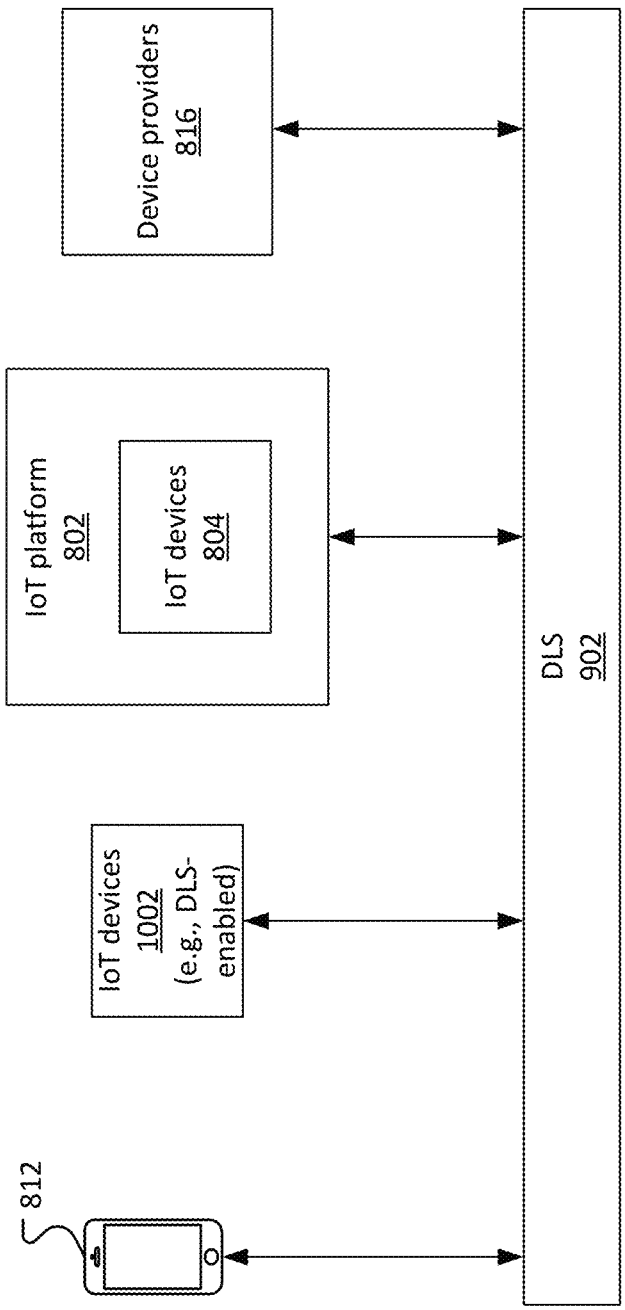
FIG. 10 illustrates an example system, including a distributed ledger system that mediates access to IoT device(s) and/or IoT platform(s), and that provides logic for device management, security, and access control.

In the examples of FIGS. 9 and 10, the components of the IoT ecosystem, such as device providers, IoT devices, IoT platform, user device, user, user app, and so forth, are partners that participate on the DLS, and leverage the DLS as a platform for participation. User identity data can be stored on the DLS, and the platform 802 can provide an identity management solution that leverages the user identity information on the DLS to verify user access to the platform 802. In the example of FIG. 10, the DLS can provide for a larger interaction beyond the IoT platform ecosystem. For example, not all interactions may leverage the user app and the IoT platform, and the DLS can be the mediator of such transactions.

The DLS 902 can be a private and/or permissioned DLS (e.g., including private and/or permissioned blockchain(s)), and can include any suitable number of distributed ledgers (e.g., blockchains). The user-to-IoT device association information and rules for access can also be on the DLS. The smart contracts on the DLS can handle transactions for data access. The smart contracts can also enforce policies and/or rules, such as access consent rules. For example, an IoT device can generate data, and the rules can enforce what entities are allowed to consume that data under what circumstances. Audit tracking for IoT interactions and rules, such as auditing for access, changes to consent, and so forth, can be managed through the DLS. Use of the DLS can make the IoT platform 802 less central for IoT interactions, e.g., reducing the centrality of the provider clouds in the ecosystem. In some examples, the IoT devices can communicate directly with the DLS, as described further below, and/or gain access to external services mediated by the DLS. In this respect, the DLS can provide another type of interface that controls access between IoT devices and other entities. The IoT devices (e.g., also described as topics) can be associated with accounts on the DLS, and the data generated by the IoT devices can also be stored on the DLS.

Use of the DLS can facilitate consent revocation operations. For example, a home may include many IoT devices that are managed through the platform 802 and/or DLS 902 as described herein. When a homeowner sells or rents the home, makes it available through a home sharing service, or otherwise lets other access its features, the implementations described herein can provide a centralized interface that allows the user to reset, add, remove, update or otherwise change access privileges across multiple IoT devices for multiple providers, with the changes stored on the DLS.

FIG. 10 illustrates an example system, including a DLS 902 that mediates access to IoT device(s) and/or IoT platform(s), and that provides logic for device management, security, and access control. In this example, the IoT devices can include device(s) 1002 that are themselves DLS-enabled and able to directly access the DLS 902, e.g., without relying on the platform 802 as a mediator. The environment can also include device(s) 804 that operate through a platform 802 to access the DLS 902. The device providers 816 can access the DLS 902 to access IoT device, propagate firmware updates to IoT devices, and/or perform other operations. The user device(s) 812 and/or user identity can be managed through the DLS 902 as well. The DLS 902 can provide (e.g., direct) IoT device access, IoT platform access, and device provider access management.

In this example, the DLS 902 can store one or more of the following: digital identity of user, digital identity of devices, digital identity of participants, user and/or device identity-based policies, asset ownership information, smart contract(s) for user-to-device access rules, smart contract(s) for data access and consent rules, smart contract(s) for provider-to-device access rules, smart contract(s) for device-to-device access rules, user-to-devices association information, user consent information for accessing device data, revocation of consent information, contextual disclosure controls, audit tracking for IoT interactions and rules, and/so forth. The DLS 902 can include one or more distributed ledgers (e.g., blockchains).

The example of FIG. 10 can be described as secure IoT with DLS at the edge, and with DLS-intelligent IoT devices. User and device identities can be managed through the DLS. The app provider can authenticate the user using the identity data on the DLS. Devices added through the user app can be associated with the user on the DLS. The smart contracts can enforce rules to handle all the (e.g., fine-grained) access control for user-to-device, device-to-device, and provider/participant-to-device access as described above. The IoT interactions can be decentralized in this example, e.g., further reducing the roles of the IoT platforms and provider clouds. The DLS can operate to control peer-to-peer data transfer and communication of notifications between devices. The DLS can provide security at the edge, interface at the edge, and/or (e.g., standards-driven) interactions. User consent for data access can be captured on the DLS, providing greater control to the user. Use of the DLS can significantly enhance user control of data ownership, consent, visibility, and/or privacy, and also provide a monetization opportunity with user participation. Implementations can leverage the data tracking, auditability, cryptography, and/or other capabilities of the DLS. The DLS can be used as data storage for IoT-generated data, providing what could be described as a middleware system along with access control rules, and so forth.

The IoT devices 1002 can be enabled to communicate directly to the DLS 902 through the firmware installed on the devices. In some instances, a location DLS can be present on the IoT devices themselves. Users, user devices 812, platforms, device providers, IoT devices, and/or other entities can have their identity information stored on the DLS, and device instances can have accounts on the DLS. Smart contract(s) on the DLS can enforce polices and/or rules that control interactions between these entities on the DLS. For example, IoT devices can write data to the DLS, and the rules can determine whether such data can be accessed by other entities such as the user app, users, device providers, other IoT devices, third party entities, and so forth. The rules can apply fine-grained controls for data access based on contextual information, and expose a particular amount of the data that is requested (e.g., but no more than that).

Figure 11:
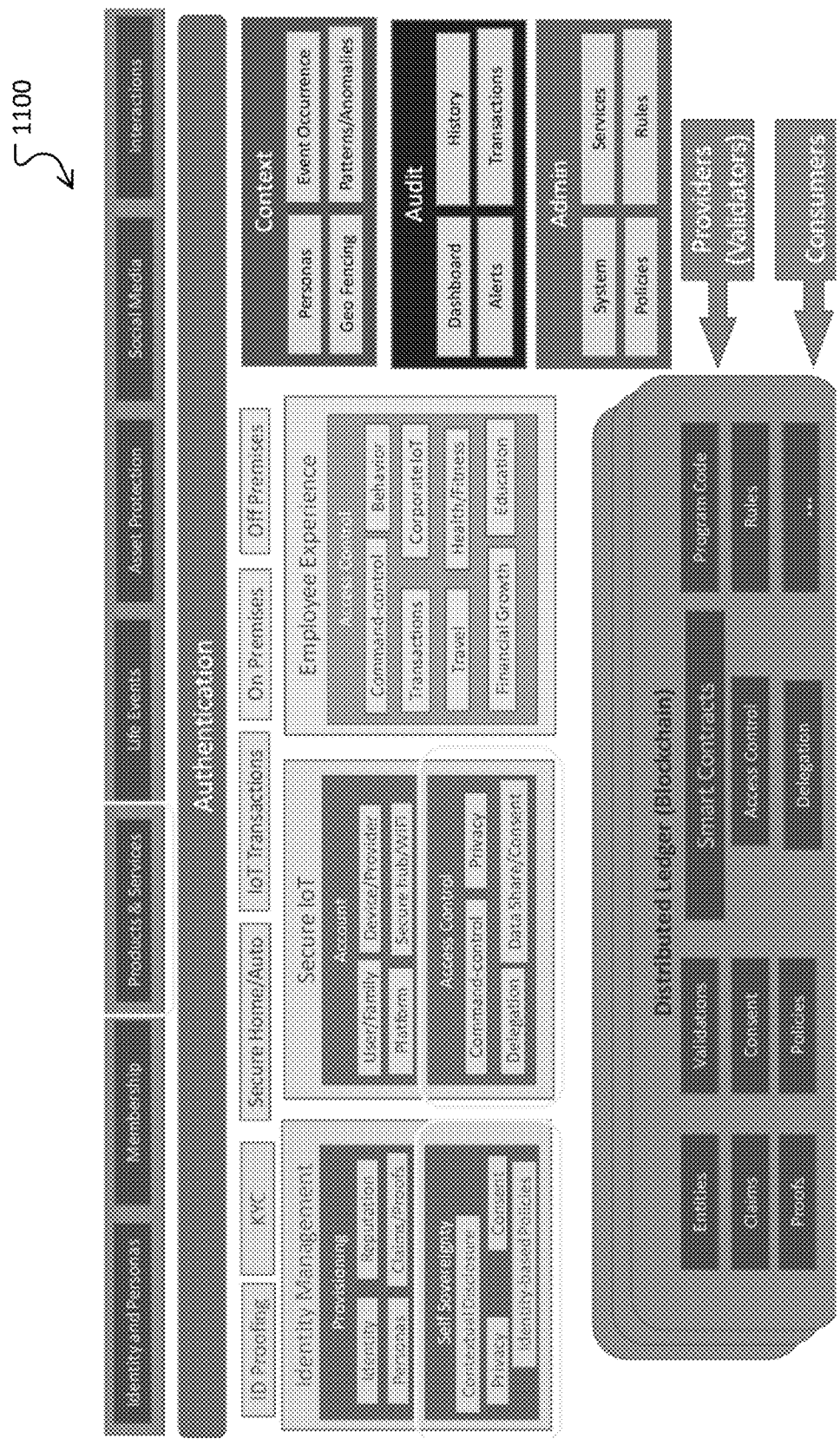
FIG. 11 is a schematic that illustrates an example system architecture.

FIG. 11 is a schematic that illustrates an example system architecture 1100, according to implementations described herein. This schematic is applicable to a home environment, a corporate environment, and/or other environments where IoT devices may be present. The implementations described herein can operate to unify different environments via a DLS.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   receiving a request, from a control device, to access information associated with an internet-of-things (IoT) device;
   responsive to the request, verifying that the control device is authorized to access the information based on at least one rule stored on a distributed ledger system (DLS), wherein verifying that the control device is authorized to access the information comprises:
      determining that the DLS comprises a first record indicating that an authorized user is associated with the control device, and
      determining an absence of a second record in the DLS indicating that the authorized user is no longer associated with the control device; and
   responsive to verifying that the control device is authorized to access the information, providing the control device with access to the information that is stored on the DLS.

2. The method of claim 1, wherein the first record is added to the DLS based on first data indicating that the authorized user has registered the control device with a security platform.

3. The method of claim 2, wherein the second record is added to the DLS based on second data indicating that the authorized user has removed the control device from the security platform.

4. The method of claim 1, wherein the DLS comprises a plurality of blocks arranged in chronological order.

5. The method of claim 1, wherein the second record indicates that the authorized user at least one of sold the control device or replaced the control device.

6. The method of claim 1, further comprising:
   receiving a second request, from a second control device, to access second information associated with a second IoT device;
   responsive to the second request, determining that the second control device is not authorized to access the second information based on the at least one rule stored on the DLS, wherein determining that the second control device is not authorized to access the second information comprises:
      determining that the DLS comprises a third record indicating that a second authorized user is associated with the second control device, and
      determining that the DLS comprises a fourth record indicating that the second authorized user is no longer associated with the second control device; and
   responsive to determining that the second control device is not authorized to access the second information, refraining from providing the second control device with access to the second information that is stored on the DLS.

7. The method of claim 1, further comprising:
   receiving a second request, from a second control device, to access second information associated with a second IoT device;
   responsive to the second request, determining that the second control device is not authorized to access the second information based on the at least one rule stored on the DLS, wherein determining that the second control device is not authorized to access the second information comprises determining an absence of a third record in the DLS indicating that a second authorized user is associated with the second control device; and
   responsive to determining that the second control device is not authorized to access the second information, refraining from providing the second control device with access to the second information that is stored on the DLS.

8. The method of claim 1, wherein the control device comprises one or more of a user application or another IoT device.

9. The method of claim 1, wherein the information is data generated by the IoT device.

10. The method of claim 1, wherein the information comprises command and control information for managing the IoT device.

11. The method of claim 1, wherein the at least one rule is included in at least one smart contract that executes on the DLS.

12. The method of claim 1, further comprising:
   causing the DLS to store signature data regarding the IoT device, wherein the signature data of the IoT device comprises, for each of a plurality of components of the IoT device, a respective signature of that component.

13. The method of claim 1, further comprising:
   determining, based on the DLS, that the authorized user is associated with a first level of access with respect to the IoT device,
   responsive to the authorized user interacting with the IoT device, causing the DLS to associate the authorized user with the first level of access with respect to one or more additional IoT devices.

14. A system comprising:
   at least one processor; and
   a memory communicatively coupled to the at least one processor, the memory storing instructions which, when executed by the at least one processor, cause the at least one processor to perform operations comprising:
      receiving a request, from a control device, to access information associated with an internet-of-things (IoT) device;

responsive to the request, verifying that the control device is authorized to access the information based on at least one rule stored on a distributed ledger system (DLS), wherein verifying that the control device is authorized to access the information comprises:
  determining that the DLS comprises a first record indicating that an authorized user is associated with the control device, and
  determining an absence of a second record in the DLS indicating that the authorized user is no longer associated with the control device; and
responsive to verifying that the control device is authorized to access the information, providing the control device with access to the information that is stored on the DLS.

15. The system of claim 14, wherein the first record is added to the DLS based on first data indicating that the authorized user has registered the control device with a security platform.

16. The system of claim 15, wherein the second record is added to the DLS based on second data indicating that the authorized user has removed the control device from the security platform.

17. The system of claim 14, wherein the DLS comprises a plurality of blocks arranged in chronological order.

18. The system of claim 14, wherein the second record indicates that the authorized user at least one of sold the control device or replaced the control device.

19. The system of claim 14, the operations further comprising:
  receiving a second request, from a second control device, to access second information associated with a second IoT device;
  responsive to the second request, determining that the second control device is not authorized to access the second information based on the at least one rule stored on the DLS, wherein determining that the second control device is not authorized to access the second information comprises:
    determining that the DLS comprises a third record indicating that a second authorized user is associated with the second control device, and
    determining that the DLS comprises a fourth record indicating that the second authorized user is no longer associated with the second control device; and
  responsive to determining that the second control device is not authorized to access the second information, refraining from providing the second control device with access to the second information that is stored on the DLS.

20. The system of claim 14, the operations further comprising:
  receiving a second request, from a second control device, to access second information associated with a second IoT device;
  responsive to the second request, determining that the second control device is not authorized to access the second information based on the at least one rule stored on the DLS, wherein determining that the second control device is not authorized to access the second information comprises determining an absence of a third record in the DLS indicating that a second authorized user is associated with the second control device; and
  responsive to determining that the second control device is not authorized to access the second information, refraining from providing the second control device with access to the second information that is stored on the DLS.

21. One or more non-transitory storage devices having instructions stored thereon which, when executed by one or more processors, cause the one or more processors to perform operations comprising:
  receiving a request, from a control device, to access information associated with an internet-of-things (IoT) device;
  responsive to the request, verifying that the control device is authorized to access the information based on at least one rule stored on a distributed ledger system (DLS), wherein verifying that the control device is authorized to access the information comprises:
    determining that the DLS comprises a first record indicating that an authorized user is associated with the control device, and
    determining an absence of a second record in the DLS indicating that the authorized user is no longer associated with the control device; and
  responsive to verifying that the control device is authorized to access the information, providing the control device with access to the information that is stored on the DLS.

* * * * *